United States Patent [19]
Heintzelman

[11] 3,867,115
[45] Feb. 18, 1975

[54] AIR WATER SEPARATOR

[76] Inventor: Leo A. Heintzelman, 4990 Burlingame S.W., Wyoming, Mich. 49509

[22] Filed: Jan. 14, 1974

[21] Appl. No.: 432,887

[52] U.S. Cl. ................. 55/218, 55/432, 55/435, 55/462
[51] Int. Cl. ........................................... B01d 45/06
[58] Field of Search ............ 55/210, 212, 213, 283, 55/218, 309, 310, 313, 319, 391, 428, 435, 462, DIG. 17, DIG. 23, DIG. 32, 432

[56] References Cited
UNITED STATES PATENTS
| | | | |
|---|---|---|---|
| 1,461,045 | 7/1923 | Paasche | 55/319 |
| 2,377,549 | 6/1945 | Gustafsson et al. | 55/DIG. 17 |
| 3,252,270 | 5/1966 | Pall et al. | 55/DIG. 17 |

Primary Examiner—Frank W. Lutter
Assistant Examiner—David L. Lacey
Attorney, Agent, or Firm—McGarry & Waters

[57] ABSTRACT

A gas-liquid separator wherein a vertical housing has a gas inlet and a gas outlet at an upper portion thereof and a liquid drain at a bottom portion thereof. A vertical conduit is provided within the housing for passage of the gases through a reversing path from the inlet to the outlet so that water precipitates from the gas and drains from the housing. A contaminant removal device fits snugly in the conduit and restricts the passage of gas therethrough. The outer periphery of the contaminant removal device comprises a resilient wiper that engages the interior surface of the conduit at least when gas is passing through the separator. The contaminant removal device permits gas to flow through the conduit but the wiper prevents the flow of liquids and particulate impurities to the outlet of the separator. The contaminant removal device is connected to a valve in the liquid drain at the bottom of the housing and acts to open the valve when gas is flowing through the separator and close the valve when gas is not flowing through the separator.

15 Claims, 11 Drawing Figures

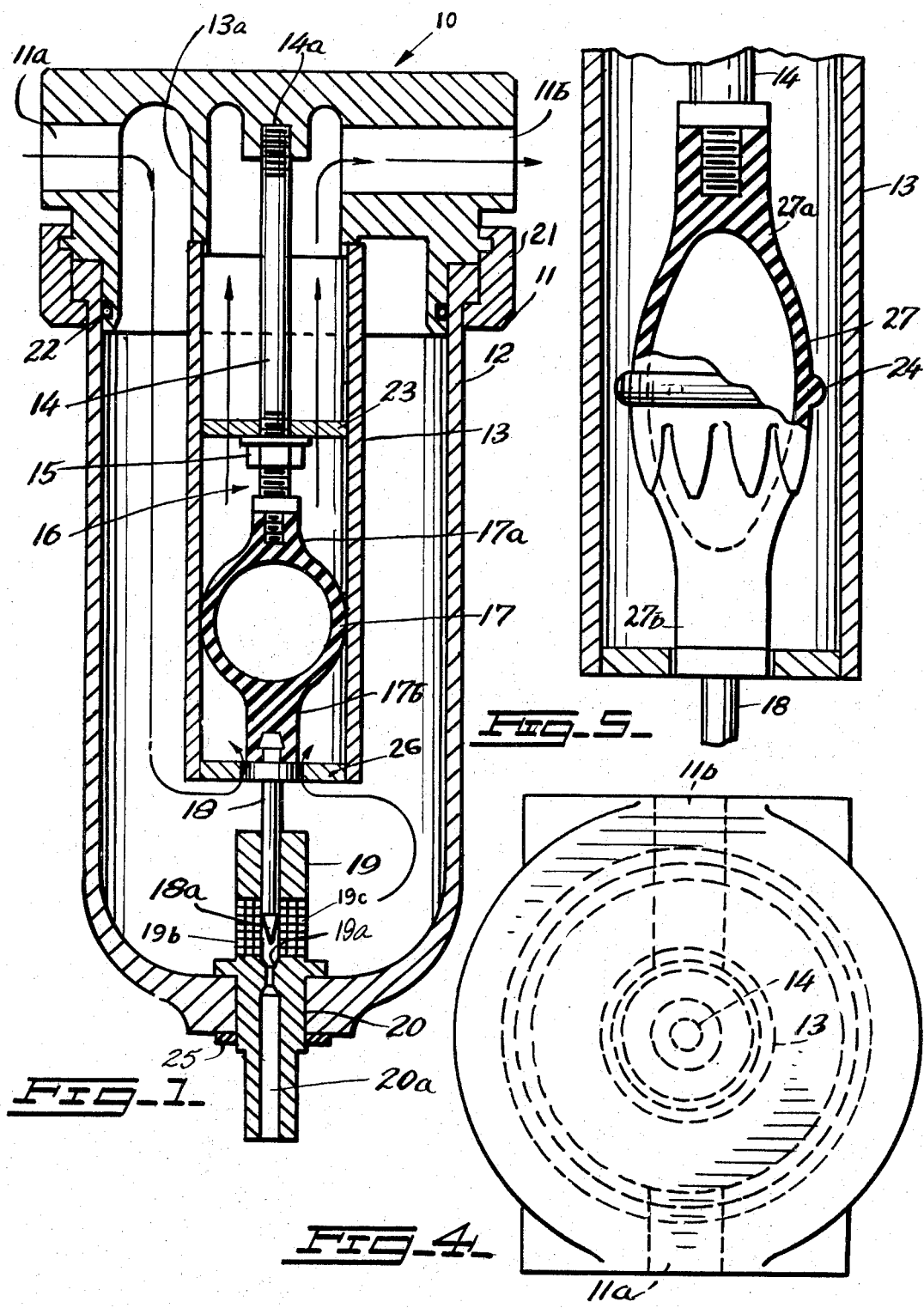

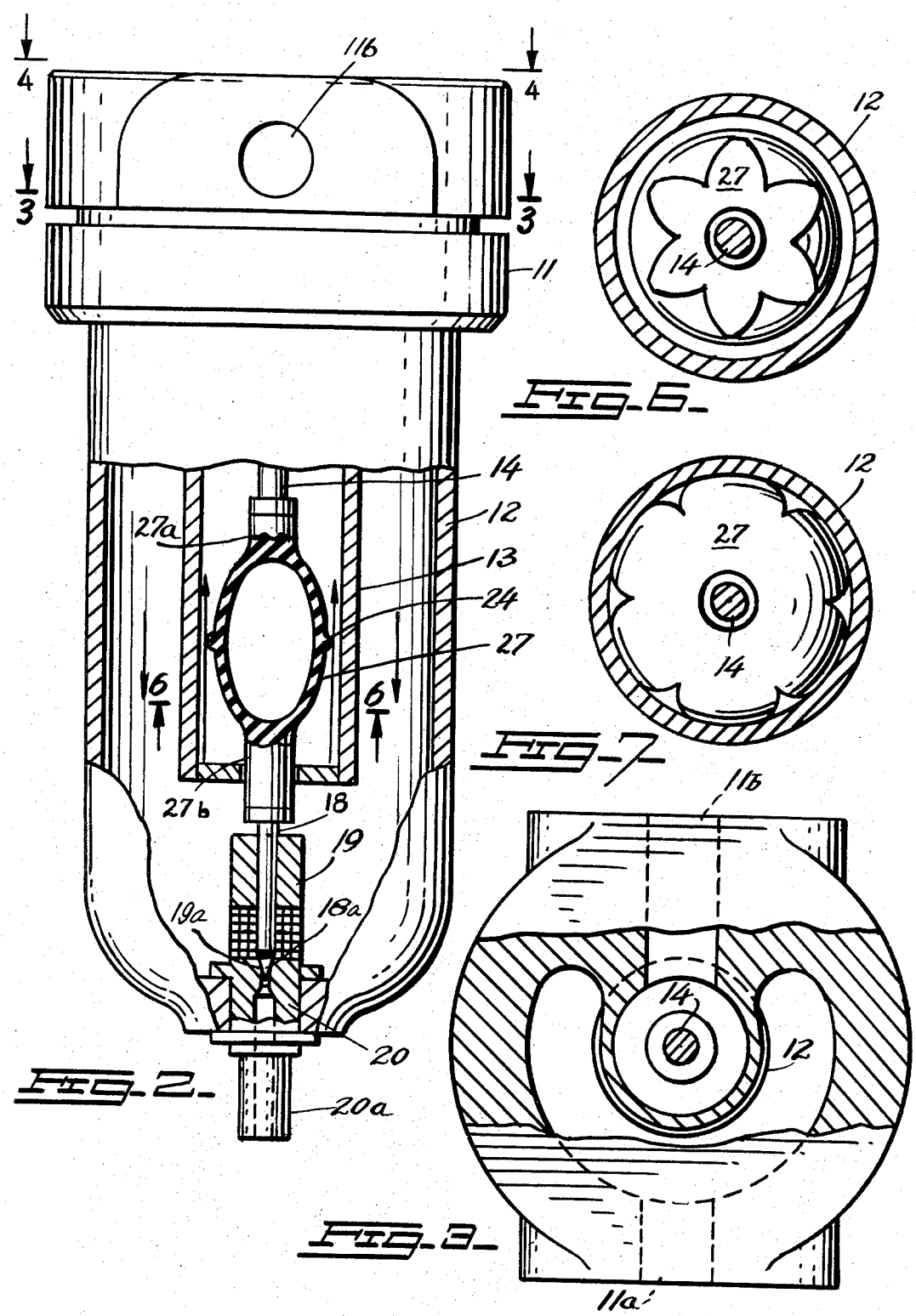

AIR WATER SEPARATOR

BACKGROUND OF THE INVENTION

1. Field of the Invention

This invention relates to a gas-liquid separator and, in particular, to a pressure operable gas-liquid separator.

2. Description of the Prior Art

Compressed air which operates air operated equipment usually has some moisture in condensed form. The moisture is normally in the air which is compressed by a compressor and the higher pressure causes some moisture to liquify in the compressed air. This moisture is in the form of droplets and is hard to remove from the compressed air. Yet the moisture is undesirable in the air operated equipment.

Gas-liquid separators heretofore available have employed various methods and apparatus for removing liquids and other contaminants from compressed gas, but such separators have not been completely satisfactory.

One air-water separator employs a reversing air flow path wherein air flows downwardly into a vertical housing from the top and then upwardly through an inner conduit to an outlet at the top. A drain is provided in the bottom of the outer housing and a movable baffle plate is positioned in the inner housing. The baffle plate is attached to a valve operating the drain and is adapted to move upwardly and open the valve when gas is flowing through the separator. This type of separator enhances water precipitation by the downward and reversing flow of air and the exposure of the air to the generally cooler interior surfaces of the separators. One drawback with this type of separator, however, is that moisture removal is not complete, and there is no means to prevent a substantial amount of moisture and other entrained contaminants from passing completely through the separator.

In order to further enhance water removal and also remove other contaminants, some separators employ filters such as screens or the like in conjunction with a convoluted air flow path. Such filters provide an improvement in particle and moisture removal, but a drawback with filters is that they become clogged and require periodic attention for replacement or cleaning. Further, as the filter becomes clogged, the passage of air through the filter becomes impeded and moisture and particulate contaminants are forced through the filter to the separator outlet.

None of the foregoing separators have been successful in removing water and other contaminants from a gas automatically and without continuous maintenance and attention.

SUMMARY OF THE INVENTION

In accordance with the present invention, a separator for automatically removing liquids and other contaminants from a gas comprises an open exterior housing having an inlet and an outlet for gas and a drain in the bottom for liquids and other contaminants. A hollow conduit is mounted in the housing with an inlet in communication with the housing inlet and an outlet in communication with the housing outlet. A contaminant removal device snugly fits in the hollow conduit so as to constrict the flow of gas to the space between the outer periphery of the contaminant removal device and the interior surface of the hollow conduit. A resilient wiper is formed around the outer periphery of the body of the contaminant removal device and is adapted to resiliently engage the interior surface of the hollow conduit at least when gas is passing through the separator. The wiper permits gas to flow through the conduit but prevents liquids and other entrained contaminants from passing the contaminant removal device. The drain is controlled by a valve, and a valve control mechanism is adapted to open the valve only when gas is passing through the separator.

The body of the contaminant removal device may be a resilient ball or bulb that fits in the hollow conduit. The wiper of the present invention may be an integrally formed bead or wiper extending around the outer periphery of the ball, or it may be the outside surface of the ball itself. The wiper may be in continuous contact with the conduit or it may be spaced apart from the conduit under normal conditions when gas is not flowing through the separator. In either case, the ball is compressible in a longitudinal direction in response to gas flow through the separator, and this longitudinal compression causes radial or lateral expansion of the ball that brings the wiper into resilient contact with the conduit.

The ball may be hollow or solid and still accomplish this purpose, and have a variety of exterior shapes, such as round or egg shaped. By providing for lateral or radial expansion of the ball in response to the pressure of gas flowing through the separator, a tighter wiper engagement and better contaminant removal action are realized. Also, when the ball is movable along the conduit to open the drain valve (as described below), the ball can move easily along the conduit to open the valve and then be expanded so as to tightly engage the hollow conduit after the valve is opened.

Another important feature of the present invention is that the opening and closing of the valve is controlled by the contaminant removal device. At least a portion of the contaminant removal device is movable along the hollow conduit in response to gas pressure, and this portion is attached to the valve control means so that the valve is opened when gas is flowing through the separator and closed when gas is not flowing through the separator. In one aspect of the present invention, the contaminant removal device itself moves along the conduit when gas is flowing through the separator, with a spring being provided to return the ball to its original position when gas flow ceases. The ball is attached to the stem of a needle valve and opens and closes the valve when it moves.

In another aspect of the present invention, the ball is stationary in the conduit but is substantially collapsible or compressible in response to gas flow through the conduit. This ball also is attached to the stem of a needle valve, but the movement necessary for the opening of the valve is provided by the compression of the ball instead of the movement of the entire ball.

In the present invention, the outer housing is vertical, and the hollow conduit is vertically disposed within it such that gas flows downwardly into the outer housing through the separator inlet and then upwardly to the separator outlet through the hollow conduit. The ball is vertically movable in the conduit, and this action opens and closes a needle valve in the bottom of the housing. An adjustable angle cock may be fitted on the drain to control the quantity of gas discharged through the drain opening.

One of the principal advantages achieved with the present invention is that the removal of liquid and other contaminants is maximized with a simple and inexpensive contaminant removal device that eliminates the need for attention-requiring filters. The tight fit between the resilient wiper in the hollow conduit ensures that liquids and other contaminants are stripped from the gas and prevented from reaching the outlet of the separator. These contaminants are then passed from the separator through the drain at the bottom without requiring any service or attention. Further, when the wiper is designed to engage the interior surfaces of the hollow conduit continuously, the downward movement of the wiper in closing the valve when gas flow through the separator is ceased causes the liquid and other contaminants to be wiped downwardly and out of the hollow conduit, thus ensuring that no contaminants are permitted to pass the contaminant removal device.

These and other advantages and features of the present invention will hereinafter appear, and for purposes of illustration, but not of limitation, a preferred embodiment of the present invention is described in detail below.

BRIEF DESCRIPTION OF THE DRAWINGS

FIG. 1 is a cross-sectional view of a gas-liquid separator constructed according to the present invention, showing a first embodiment of a contaminant removal device and showing the drain valve open.

FIG. 2 is a partial sectional view of a gas-liquid separator employing a second embodiment of a contaminant removal device and showing the drain valve in a closed position.

FIG. 3 is a cross-sectional view taken along line 3—3 of FIG. 2.

FIG. 4 is a view taken along line 4—4 of FIG. 2.

FIG. 5 is partially broken and partially sectional view of the contaminant removal device shown in FIG. 2.

FIG. 6 is a sectional view taken along line 6—6 of FIG. 2, showing the contaminant removal device in the narrowed position.

FIG. 7 is a view similar to FIG. 6 showing the contaminant removal device in an expanded position.

DESCRIPTION OF PREFERRED EMBODIMENTS

Figure 8:
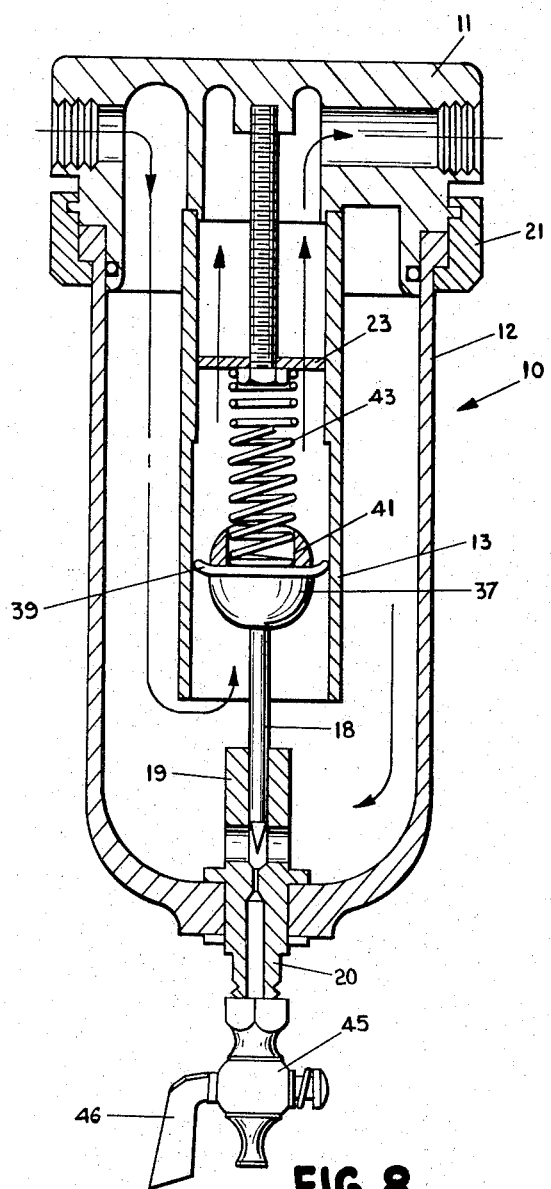
FIG. 8 is a cross-sectional view of the gas-liquid separator of the present invention employing a third embodiment of a contaminant removal device, showing the drain valve in an open position.

A gas-liquid separator 10 constructed in accordance with the present invention is shown in the drawings. For purposes of illustration, the separator will be described as it would function in removing water from air, although the same principles apply to the removal of other liquids and contaminants from other gases. Gas-liquid separator 10 comprises a valve cap assembly 11 secured to an elongated housing 12. An inlet opening or port 11a is formed in one side of the valve cap assembly 11 to permit air and entrained water and other contaminants to enter the separator, and an outlet opening or port 11b at an opposite side of the cap assembly 11 permits dehydrated air to pass from the separator. The elongated housing 12 is desirably secured to the cap assembly 11 through a collar 21. O-rings 22 which fit within circumferential grooves in the valve cap assembly 11 provide a seal between the housing 12 and the valve cap assembly 11.

An elongated sleeve or hollow conduit 13 is secured to the bottom of the cap assembly 11 and communicates with outlet port 11b through a corresponding opening 13a in the valve cap. Conduit 13 may be formed from a length of pipe or plastic or metal tubing machined smoothly on the inside and preferably is cylindrical in shape. The bottom end of conduit 13 extends downwardly from the cap assembly 11 into elongated housing 12. An annular guide member 26 may be secured to the bottom of the elongated conduit 13.

A rod 14 has an upper threaded end 14a which is threaded into a bore in the cap assembly 11. The lower end 16 of rod 14 is also threaded and threadably engages a contaminant removal device 17 in the form of a hollow rubber bulb having a threaded bulb extension 17a that fits on the lower end of the rod. A machine nut is threaded on lower end 16 of the rod and engages a cross member 23 in conduit 13 and holds the conduit in position against the top of the separator.

The lower end 17b of the bulb 17 is attached to a vertical valve stem 18, which is provided with a lower tapered valve member 18a. A small opening is provided between the guide member 26 and the lower end 17b of the bulb to permit passage of air therebetween.

The bulb 17 is of a rubbery material normally having a generally spherical shape. The outer diameter of the bulb 17 is slightly less than the inner diameter of the elongated sleeve 13, as illustrated in FIG. 2. However, the bulb will radially expand under pressure from the bottom as when gas is passing through the conduit 13 to constrict the flow of gases therethrough, as illustrated in FIG. 1. When expanded, the outer surface of the bulb acts as a resilient wiper and prevents water and other contaminants entrained in the air from reaching the separator outlet.

A needle valve 19 is mounted at the bottom of the elongated housing 12 and has a vertical bore 20a extending therethrough. A valve seat 19a is formed in the bore 20a to mate with the tapered valve element 18a for closing off the bore 20a. A transverse opening 19b is formed through the valve at the top of valve seat 19a. Opening 19b may be provided with a screen material 19c to prevent contaminants from clogging the needle valve. Water removed from the air enters opening 19b in the valve from the inside of elongated housing 12 and passes out of the housing through opening 20a. A threaded end 20 is provided on the lower end of valve 19 for threadably securing the valve to a threaded opening in the lower end of the elongated housing 12. A gasket 25 is desirably provided on the valve beneath the elongated housing 12 to seal the valve to a water exhaust line (not shown).

Referring now to FIGS. 2 and 5–7, a second embodiment of the contaminant removal device of the present invention is shown. The body of this contaminant removal device is a modified rubber bulb 27, which is oblong in shape and has a plurality of radial protrusions that face downwardly from the central portion of the bulb 27. A wiper in the form of a bead 24 extends around the outer periphery of the bulb and engages the interior surface of conduit 13 when gas is flowing through the separator and the bulb is radially expanded (as illustrated in FIG. 7). when no gas is flowing through the separator, bulb 27 returns to its original shape (as illustrated in FIGS. 3, 5 and 6), leaving space between bead 24 and the conduit 13. When gas is passing through the separator, the bulb becomes compressed longitudinally and, as a result, expands laterally or radially. This causes bead 24 to resiliently engage the interior surface of conduit 13 with sufficient force to permit the gases to squeeze by the bulb, while condensing the small water droplets in the air on the bulb.

When the bulb is in the compressed position illustrated in FIGS. 1 and 7, the tapered valve member 18a is separated from the valve seat 19a, thereby permitting water to pass through the screen and through the bore 20a in the valve. Conversely, when the bulb is in its normal position, illustrated in FIGS. 2, 5 and 6, the valve element 18a is in contact with the valve seat 19a to seal the bore 20a.

In operation, the inlet opening 11a is normally connected to a compressor (not shown) and the outlet 11b is normally connected to air-operated equipment (not shown). A shut off valve (not shown) is in the line between the outlet 11b and the air-operated equipment. Air and water mixture from the compressor enters the separator through inlet opening 11a. When the outlet valve is open, unbalanced pressure exists between the top and the bottom of the bulb. Initially, the bulb is in an extended position, with the outlet valve closed (as illustrated in FIG. 2). However, the air pressure in the separator causes the bulb to compress longitudinally in the conduit. This compression in turn causes the bulb to expand radially and shorten so that the valve element 18a separates from the valve seat 19a. The air will still pass around the sides of the bulb and the outlet 11b, but during this procedure, the air undergoes a reversal of direction upon entering conduit 13, and this causes entrained water and contaminants to precipitate from the air. The condensed water then drains into the bottom of the housing 12 and out through bore 20a. Further, as the air squeezes past the wiper on the bulb, additional water and other contaminants are squeezed from the air. Bead 24 of bulb 27 and the outer periphery of bulb 17 each resiliently engages the inner surface of the conduit 13. When the bulb (or wiper) is resiliently engaging the conduit wall, the pressure on the bulb must build up to a sufficient level to overcome the resilient force exerted by the bulb against the conduit wall before the pressure will deflect the bulb inwardly a sufficient distance from the wall of the conduit to permit air to pass around the bulb. This continued outward resilient force exerted by the bulb causes a pressure differential between the upstream and downstream sides of the bulb to be maintained and it also causes a space between the outer periphery of the bulb and the conduit to be maintained at a minimum amount sufficient only for the air to pass by the bulb. The air is thus squeezed as it passes the bulb, and this squeezing of the air strips the water and particulate material, such as rust, corrosion, etc., from the air. Such water and particulate material fall to the bottom of the separator to be removed through the drain or by removal of valve 19. Thus, the bulb acts as a filter to remove the moisture and particulate matter from the air without encountering the problems attendant to a removable screen filter.

When the outlet valve is closed, the bulb returns to the position illustrated in FIG. 2 and the valve element 18a closes against the valve seat 19a. Thus, when the outlet is closed, the air is prevented from leaking out through the drain bore 20a.

Figure 9:
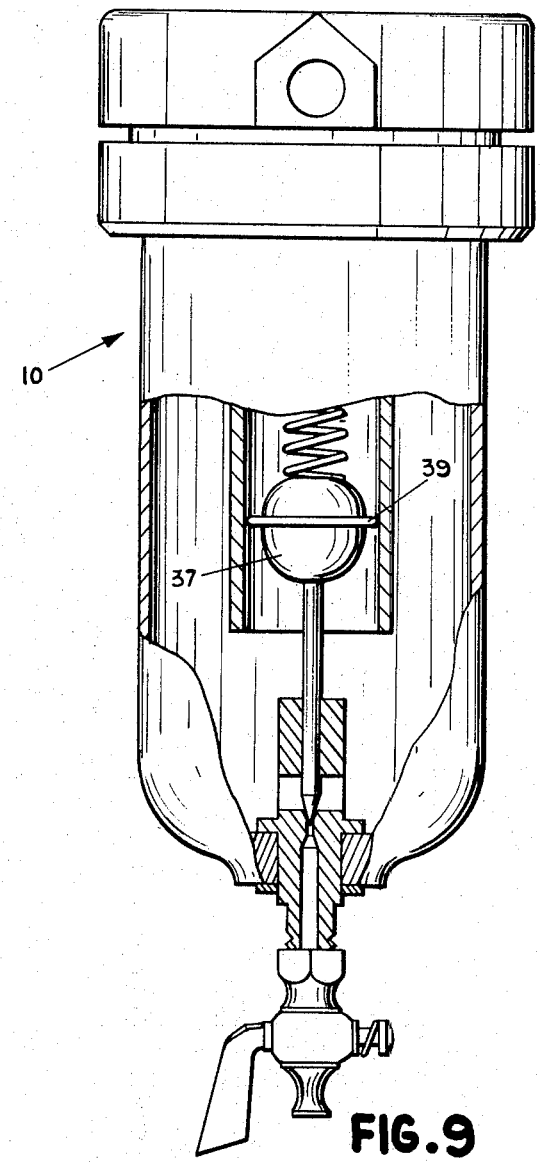
FIG. 9 is a partially broken view of the gas-liquid separator shown in FIG. 8, showing the drain valve in a closed position.

Another embodiment of the contaminant removal device of the present invention is shown in FIGS. 8 and 9. In this embodiment, the body of the contaminant removal device is a solid rubber ball 37 that is movably mounted for vertical reciprocation in conduit 13. The body need not be round but may be cylindrical or any other convenient shape, as long as it fits loosely inside the conduit. A circular wiper 39 is formed around the outer periphery of ball 37 and resiliently engages the interior surface of conduit 13. Wiper 39 is similar in appearance and function to bead 24 in the second embodiment of the contaminant removal device shown in FIG. 2, except that it is wider than bead 24 and continuously engages the interior surface of the conduit, even when gas is not passing through the separator. The ball is still somewhat compressible and this causes radial expansion that presses the wiper against the conduit with additional force, but the expansion is less than the expansion present with a more compressible ball.

Wiper 39 is deflected from the lateral position shown in FIG. 9 to the raised position shown in FIG. 8 when gas is flowing past the wiper. This permits gas to pass but causes moisture precipitation and prevents moisture and other contaminants from reaching the separator outlet.

One different aspect of ball 37 is that, being less compressible than bulbs 17 and 27, the compression of the ball is not utilized to open the valve. Rather, the whole ball slides along the conduit to open the valve. The upper portion of the ball is provided with an opening 41 into which fits a compression spring 43. Compression spring 43 engages crossmember 23 and resiliently urges the ball in a downward direction to close the valve when gas pressure does not hold the ball in an upward position. The lower end of the ball is attached to valve stem 18 and operates needle valve 19 in the same manner as described above.

Another feature of the present invention shown in FIGS. 8 and 9 is the incorporation of an adjustable angle cock 45 on the lower end 20 of valve 19. For this purpose lower end 20 is threaded to receive the angle cock. The purpose of angle cock 45 is to limit the amount of gas that is permitted to escape from valve 19 while gas is flowing through the separator. For automatic operation, it is necessary that valve 19 be continuously open in order to continuously bleed moisture from the system. However, it is desirable that the amount of air permitted to escape through valve 19 be adjustable, an angle cock 45 conveniently serves the purpose. A handle 46 on the angle cock may be adjusted to vary the amount of air flow through valve 19.

Figures 10A, 10B, 11:
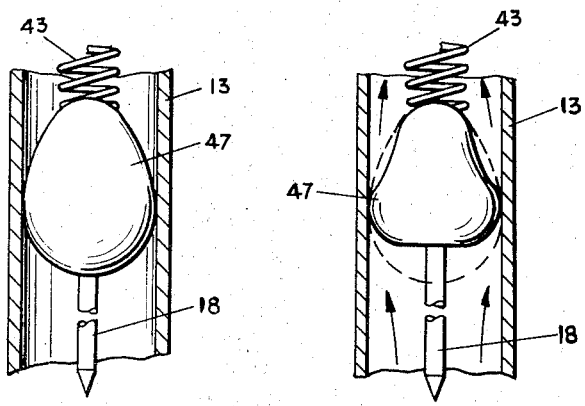
FIGS. 10a and 10b are broken sectional views showing a fourth embodiment of a contaminant removal device, showing the position of the contaminant removal device with gas flow stopped and gas flowing, respectively.
FIG. 11 is a broken sectional view showing a fifth embodiment of a contaminant removal device.

Still another type of contaminant removal device is shown in FIGS. 10a and 10b. This device is an egg shaped ball 47 formed of a resilient material. The ball could be hollow but preferably is solid. Ball 47 fits snugly in conduit 13 in its normal, uncompressed state (as shown in FIG. 10a), and slides easily along conduit 13. When gas passes through the separator, the ball first slides upwardly against the pressure of spring 43 in order to open valve 19, and then the ball is compressed by the pressure on the ball to the shape shown in FIG. 10b. In its compressed position, the outer periphery of the ball more snugly engages the interior surface of the conduit and functions as a wiper in the same manner as wiper 39 on ball 37.

Another type of movable contaminant removal device, shown in FIG. 11, comprises a body 57 in the form of a cylindrical resilient member and a wiper 59 substantially the same as wiper 39. The principal differences between body 57 and ball 37 is that body 57 has a protrusion 61 on the top thereof that fits in spring 43 and holds it in place, rather than an opening like opening 41 in ball 37.

One important feature present in all of the various types of contaminant removal devices shown herein is that each has a resilient outer wiper (whether it be a separate wiper or simply the outer periphery of the device) that resiliently engages the interior surface of the conduit, at least when gas is flowing through the separator, thus stripping water and other contaminants from the gas.

Another feature of the wipers employed in the movable contaminant removal devices 37 and 57 is that each wiper is in continuous contact with the conduit, so that the wiper serves to wipe the water and contaminants downwardly from the interior of the conduit when the device is moved downwardly to close valve 19.

Another feature common to each contaminant removal device is that the wiping action of the wiper is enhanced by the increased radial force exerted on the wiper when the body of the device is compressed.

Another important feature of the various types of contaminant removal devices shown herein are that they all serve the dual function of stripping water and other contaminants from the air while automatically operating needle valve 19. To serve this dual function, it is necessary that at least a portion of the device be movable longitudinally when gas passes through the separator, so that the valve stem may be displaced upwardly to open the valve.

It should be understood that the foregoing is merely illustrative of the preferred practice of the present invention and that various changes and modifications may be made in the arrangements and details of construction of the embodiments described herein without departing from the spirit and scope of the present invention.

The embodiments of the invention in which an exclusive property of privilege is claimed are defined as follows:

1. A gas-liquid separator for separating liquids and other contaminants from a pressurized gas comprising:
   a housing having an open interior;
   gas inlet means in said housing for receiving gas containing liquid and other contaminants;
   drain means in a bottom portion of said housing for draining the liquid and other contaminants therefrom;
   gas outlet means in said housing for exhausting gas from the separator;
   a hollow conduit having an inlet in communication with the housing inlet and an outlet in communication with the housing outlet such that the gas must flow through the conduit in order to leave the separator by the housing outlet;
   contaminant removal means fitted in the hollow conduit and adapted to constrict the flow of gas to the space between said means and the interior surface of the hollow conduit in passing through the conduit, said contaminant removal means comprising resilient wiper means at the outer periphery thereof adapted to resiliently engage the interior surface of the hollow conduit at least when gas is flowing through the separator, said wiper means being resiliently urged outwardly against the interior surface of the conduit with sufficient force to impair the passage of estrained liquids and particulate contaminates in said gas past the wiper means, while permitting pressurized gas to pass through the conduit between the wiper means and the interior of the hollow conduit;
   valve means in the separator for opening and closing the drain means; and
   valve control means in the separator adapted to open the valve means when gas is passing through the separator and close the valve means when gas is not passing through the separator.

2. A gas-liquid separator as claimed in claim 1 wherein:
   at least a portion of the contaminant removal means is longitudinally movable in the hollow conduit between a first and a second position, said movable portion being adapted to move to its second position when gas flows through the separator at a predetermined pressure;
   the valve control means is operably connected to said movable portion of the contaminant removal means, such that the valve control means maintains the valve means in a closed position when said portion is in its first position and maintains the valve means in an open position when said portion is in its second position; and
   the separator includes resilient biasing means adapted to resiliently urge said portion toward its first position, such that said portion is returned to its first position whenever the gas pressure across the contaminant removal means drops to a predetermined level.

3. A gas-liquid separator as claimed in claim 2 wherein:
   the contaminant removal means comprises a flexible resilient bulb means that is fitted in said hollow conduit, with the outer periphery of the bulb means forming the wiper means, said bulb means having upstream and downstream sides with respect to the direction of gas flow through the hollow conduit, the downstream side being fixed in position with respect to the hollow conduit and the upstream side being longitudinally movable along the conduit in response to the gas pressure differential between the upstream and downstream sides of the bulb means;
   said upstream side constitutes said movable portion of the contaminant means and is operably connected to said valve control means, the first position of said upstream side being a natural position which it occupies in the absence of a gas pressure differential between the upstream and downstream sides of the bulb means and the second position being a compressed position which it occupies in the presence of a predetermined gas pressure differential between the upstream and downstream sides;

said bulb means being formed of an elastic material such that the bulb means expands laterally outwardly in response to the longitudinal compression of the bulb means, said lateral expansion being such that when the bulb means is in its compressed position the outer periphery of the bulb means snugly and resiliently engages the interior surface of the conduit; and said resilient biasing means comprises the elastic resistance of the bulb means to compression from its natural to its compressed position, said elastic resistance being sufficient to return the bulb means to its natural position, said elastic resistance being sufficient to return the bulb means to its natural position in the absence of a predetermined gas pressure differential between the upstream and downstream sides of the bulb means.

4. A gas-liquid separator as claimed in claim 3 wherein the bulb means is hollow and has a generally round cross section.

5. A gas-liquid separator as claimed in claim 3 wherein the bulb is hollow and has a generally oblong cross section.

6. A gas-liquid separator as claimed in claim 3 wherein the hollow conduit is cylindrical and the outer periphery of the bulb means is generally circular, with the diameter of the bulb means being slightly less than the diameter of the interior of the conduit when the bulb means is in its natural position, the diameter of the bulb means expanding to resilient engage the interior surface of the conduit when the bulb means is in its compressed position.

7. A gas-liquid separator as claimed in claim 6 wherein the bulb means comprises a plurality of radial protrusions spaced around the outer periphery thereof.

8. A gas-liquid separator as claimed in claim 3 wherein the outer periphery of the bulb means comprises a raised bead that extends around the bulb means, said raised bead serving as the wiper means.

9. A gas-liquid separator as claimed in claim 8 wherein:

the hollow conduit comprises an upper end at the upper portion of the housing in communication with the gas outlet means and a lower end position above said valve means at a lower portion of the housing;

said valve means is a needle valve; and said valve control means comprises a valve stem extending from an upper end attached to the upstream side of the bulb to a lower end operably connected to the needle valve to open and close the needle valve in response to longitudinal movement of the valve stem.

10. A gas-liquid separator as claimed in claim 1 wherein:

the contaminant removal means is longitudinally movable in said hollow conduit between first and second positions, said contaminant removal means being urged to move to said second position in response to the flow of gas through the separator from the housing inlet to the housing outlet;

spring biasing means in the separator are adapted to urge the contaminant removal means toward the first position such that the contaminant removal means occupies its second position when gas is flowing through the separator but is returned to its first position when the flow of gas through the separator ceases; and the valve control means are operably connected to the contaminant removal means such that the valve means is open when the contaminant removal means is in the first position and is closed when the contaminant removal means is in its second position.

11. A gas-liquid separator as claimed in claim 10 wherein:

the contaminant removal means is formed of a flexible resilient material such that it is longtudinally compressible in said hollow conduit when gas is flowing through the separator, said contaminant removal means being laterally expandable in response to longitudinal compression thereof such that the outer periphery of the contaminant removal means snugly and resiliently engages the interior surface of the conduit when gas is passing through the separator, the engagement of the outer periphery of the contaminant removal means and the interior surface of the conduit being sufficiently snug to substantially prevent liquids and particulate contaminants entrained in the gas from passing the contaminant removal means.

12. A gas-liquid separator as claimed in claim 11 wherein the outer periphery of the wiper means comprises a raised bead that resiliently engages the interior surface of the conduit at least when gas is flowing through the separator.

13. A gas-liquid separator as claimed in claim 11 wherein the wiper means comprises the outer periphery of the contaminant removal means.

14. A gas-liquid separator as claimed in claim 10 wherein the wiper means comprises a resilient, flexible wiper extending around the outer periphery of the contaminant removal means, the wiper being in continuous resilient engagement with the interior surface of the conduit as the contaminant removal means is moved along the conduit between its first and second positions.

15. A gas-liquid separator as claimed in claim 10 wherein:

the hollow conduit comprises an upper end in communication with the gas outlet at an upper portion of the housing and a lower end positioned over the drain means at a lower portion of the housing;

the valve means is a needle valve; and the valve control means is a valve stem having an upper end attached to the contaminant removal means and a lower end operably connected to the needle valve.

* * * * *